United States Patent
Norton et al.

(10) Patent No.: US 6,411,621 B1
(45) Date of Patent: Jun. 25, 2002

(54) APPARATUS, METHOD AND SYSTEM FOR AN INTERMEDIATE RELIABILITY PROTOCOL FOR NETWORK MESSAGE TRANSMISSION AND RECEPTION

(75) Inventors: Michael Robert Norton, Naperville; Adam Stanislaw Pajerski, Hawthorn Woods; Anton J. Roug, Glen Ellyn, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/137,955

(22) Filed: Aug. 21, 1998

(51) Int. Cl.[7] ............................................... M04L 12/56
(52) U.S. Cl. ...................................... 370/394; 370/514
(58) Field of Search ............................. 370/394, 395.5, 370/395.52, 395.62, 503, 509, 510, 511, 512, 513, 514, 354, 358, 365, 366

(56) References Cited

U.S. PATENT DOCUMENTS 5,943,374 A * 8/1999 Kokuryo et al. ............ 375/354
6,134,246 A * 10/2000 Cai et al. .................... 370/474

\* cited by examiner

Primary Examiner—Kwang B. Yao
(74) Attorney, Agent, or Firm—Nancy R. Gamburd (57) ABSTRACT

An apparatus, method and system are provided for an intermediate reliability protocol for network message transmission and reception, and are particularly suited for real time applications, such as internet telephony. The preferred system embodiment includes a plurality of servers, connected to each other over a plurality of networks, such as over two ethernets. A first server, when operative, includes program instructions to transmit a message. A second server, which is coupled to the first server over the networks, when operative, includes program instructions to receive the message. Under typical circumstances, the received message will be delivered locally on the second server, to a designated local process. Under other circumstances, the second server will resynchronize to the received message, dropping stored messages and avoiding further delay in message delivery. For such resynchronization, when the received message has a sequence number which is out of sequence, the second server has further instructions, first, to determine whether a reset bit is set and, when the reset bit is set, to resynchronize to the received message; second, to determine whether the first server is inactive and, when the first server is inactive, to resynchronize to the received message; and third, to determine whether a predetermined number of transmit reject messages have been transmitted to the first server and, when the predetermined number of transmit reject messages have been transmitted to the first server, to resynchronize to the received message.

94 Claims, 9 Drawing Sheets

APPARATUS, METHOD AND SYSTEM FOR AN INTERMEDIATE RELIABILITY PROTOCOL FOR NETWORK MESSAGE TRANSMISSION AND RECEPTION

FIELD OF THE INVENTION

The present invention relates in general to communication system protocols, and more particularly, to an apparatus, method and system for an intermediate reliability protocol for network message transmission and reception.

BACKGROUND OF THE INVENTION

Various communication system protocols have evolved both having varying degrees of reliability and having varying delay or timeliness characteristics. In general, those protocols having very high reliability, virtually guaranteeing the arrival of a data packet at its specified destination, generally have high delay characteristics. For example, the X.25 protocol provides guaranteed delivery of every message transmitted, but such guaranteed delivery may occur over a longer period of time than desirable or preferable for real time applications. For example, for telephony, information that is delayed by more than a few seconds, or even one-half second, is typically no longer required, and has become useless and irrelevant to real time voice communications. Similarly, other protocols such as TCP/IP also have high reliability characteristics with correspondingly high delay characteristics, and accordingly also may be inappropriate for real time applications.

Conversely, protocols such as UDP/IP, without such high reliability, are generally excessively lossy for such real time applications, such as telephony. In such protocols, messages are frequently lost, and many real time situations and applications require a higher degree of reliability.

Voice telecommunications and other real time applications, as a consequence, have different timing and reliability requirements than more typical or general internet applications. Typical internet applications such as electronic mail have a guaranteed delivery, but a timing delay in the delivery is not very important. With real time applications such as telephony, however, timing and other delay issues are very important, while the occasional loss of a message under heavy traffic circumstances is considered relatively acceptable or normal.

A connection oriented protocol is also not desirable or preferable for such real time applications, because the total number of connections in a complex telephony system could be very high. In addition, various high reliability systems achieve that reliability by redirecting traffic when a hardware node is unavailable and, for a telephony system, reestablishing such connections is highly undesirable.

As a consequence, a need remains for a protocol having an intermediate level of reliability, having reasonable or acceptable assurance that messages are delivered, while simultaneously providing sufficiently timely delivery to meet the requirements of real time applications. Such a protocol should be able to buffer messages to reduce message loss, and should be able to detect hardware failures in the network and reroute traffic around them. In addition, such an apparatus, method and system should be capable of implementation in a cost-effective fashion into existing telecommunication systems and networks.

SUMMARY OF THE INVENTION

The apparatus, method and system of the present invention provide an intermediate reliability protocol, having reasonable assurance of message delivery, and having timely delivery with low delay characteristics, especially suited for real-time applications such as inter-system communication in or between telephony applications. Resynchronizations may occur to avoid undue delays in message transmission and reception, while messages may be buffered or stored to reduce message loss. Such resynchronization, including clearing buffers and resetting sequence numbers, occurs while the protocol is maintained as up and valid, with ongoing communication, rather than with the prior art loss of the connection.

Potential hardware failures in the network are detected automatically, such as the loss of an ethernet, with traffic correspondingly re-routed. In addition, the apparatus, method and system of the present invention may be implemented in a cost-effective fashion into existing telecommunication systems and networks, and may be implemented as an upper level protocol on top of existing protocols such as UDP/IP.

The preferred system embodiment includes a plurality of servers, connected to each other over a plurality of networks, such as over two ethernets. A first server, when operative, includes program instructions to transmit a message. A second server, which is coupled to the first server over the networks, when operative, includes program instructions to receive the message and, under typical circumstances, the received message will be delivered locally on the second server, to a designated local process. Under other circumstances, the second server will resynchronize to the received message, dropping stored messages and avoiding further delay in message delivery. For such resynchronization, when the received message has a sequence number which is out of sequence, the second server has further instructions, first, to determine whether a reset bit is set and, when the reset bit is set, to resynchronize to the received message; second, to determine whether the first server is inactive and, when the first server is inactive, to resynchronize to the received message; and third, to determine whether a predetermined number of transmit reject messages have been transmitted to the first server and, when the predetermined number of transmit reject messages have been transmitted to the first server, to resynchronize to the received message.

In the various embodiments, such resynchronization includes resynchronizing to the sequence number of the currently received message, and clearing receive buffers in a shared memory of the second server. The second server has further instructions to maintain the state of the protocol as valid with the first server during such resynchronization. In addition, when the received message has a sequence number which is out of sequence, the second server will buffer the received message in a shared memory, and will transmit a reject message to the first server, requesting a retransmission of outstanding or missed messages.

Potential hardware failures are detected, in the preferred system embodiment, when a message has not been received from the first server during a first predetermined period of time, and under such circumstances, the second server has further instructions to transmit a first connectivity message to the first server over a first network of the plurality of networks, such as a first ethernet. If and when a response message has not been received from the first server during a second predetermined period of time, the second server has further instructions to transmit a second connectivity message to the first server over a second network of the plurality of networks, such as a second ethernet. If and when a response message has not been received from the first server during a third predetermined period of time, the second server has further instructions to set a status of the first server as inactive, and to clear all transmit buffers and all receive buffers, in a shared memory of the second server, pertaining to the first server.

Numerous other advantages and features of the present invention will become readily apparent from the following detailed description of the invention and the embodiments thereof, from the claims and from the accompanying drawings.

DETAILED DESCRIPTION OF THE INVENTION

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for a protocol having an intermediate level of reliability, having reasonable or acceptable assurance that messages are delivered, while simultaneously providing sufficiently timely delivery to meet the requirements of real time applications. The apparatus, method and system of the present invention provide such an intermediate reliability protocol, having reasonable assurance of message delivery, and having timely delivery. In accordance with the present invention, messages may be buffered or stored to reduce message loss, and hardware failures in the network are detected with traffic rerouted around them. In addition, the apparatus, method and system of the present invention may be implemented in a cost-effective fashion into existing telecommunication systems and networks, and may be implemented as an upper level protocol on top of existing protocols such as UDP/IP.

As discussed in greater detail below, the various embodiments of the present invention provides an "intermediate" level of reliability, coupled with timely delivery, which is significantly different than other systems and protocols utilized for message transmission and reception. In accordance with the present invention, a level of reliability is provided which is not absolutely guaranteed, on the one hand, but nonetheless provides sufficient reliability for reasonable and desirable performance for real-time applications, such as voice communications. A particularly significant advantage of the various embodiments is the provision of such reasonable reliability while simultaneously providing timely delivery of messages, reducing or eliminating delays in message transmission and reception.

The various embodiments of the present invention accomplish this result through a unique integration of different or divergent methods of managing message transmission and reception. To provide a reasonably high level of reliability, the various embodiments track message transmission and reception, and buffer messages to reduce potential message loss, maintaining transmit buffers for unacknowledged messages and maintaining receive buffers for out of sequence messages. To provide for sufficiently timely delivery for real time applications, however, in the event such message tracking is or may be creating undesirable delays, the protocol will resynchronize. Such resynchronization involves a determination that for real time applications, it is more significant to be current than to be perfectly reliable. As a consequence, messages which may be older than one-half second to two seconds are considered to have become irrelevant and are dropped, with the protocol resynchronizing to whatever message is then current. Also as a significant departure from the prior art, such resynchronization is performed while the protocol is maintained as up and valid (rather than dropped or torn down connection), with communication continuing during such resynchronization. In addition, also as discussed in greater detail below, the various embodiments provide a means to automatically switch between two different networks (ethernets), to automatically re-route messages in the event of a hardware failure.

Figure 1:
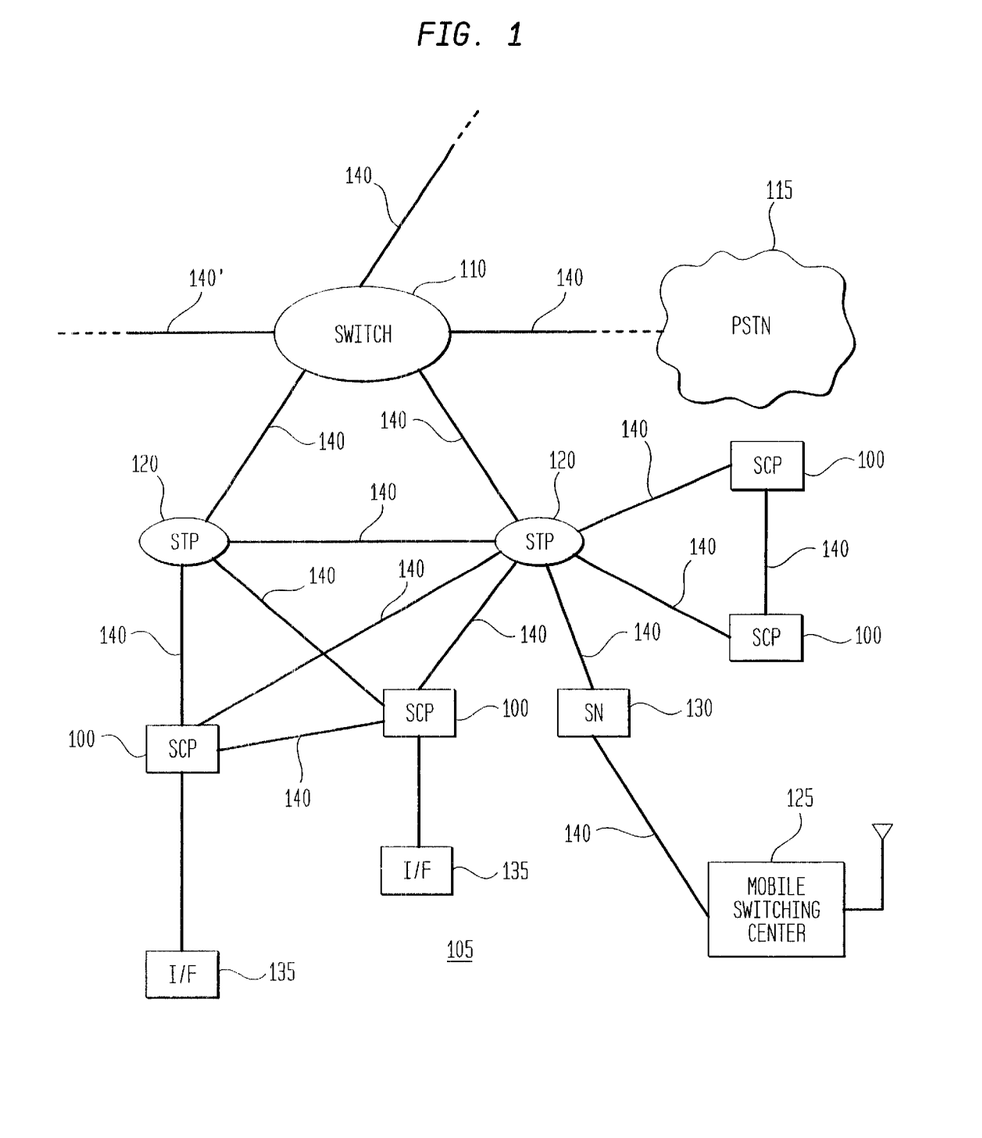
FIG. 1 is a block diagram illustrating a system embodiment in accordance with the present invention.

FIG. 1 is a block diagram illustrating a network 105 having a system embodiment 100 of the present invention. As illustrated in FIG. 1, the network 105 includes one or more switches 110, connected or coupled via signaling links 140 to the public switched telephone network ("PSTN") 115 and to various other nodes, such as signal transfer points ("STPs") 120. The STPs 120 are, in turn, coupled via signaling links 140 to other network nodes, such as to service control points ("SCPs") 100, and to other nodes such as a service node ("SN") 130 connected to a mobile switching center 125. In the preferred embodiment, the apparatus, method and system of the present invention are contained in the network nodes referred to as service control points 100. Alternatively, the apparatus, method and system of the present invention may be contained with any other network node.

The service control points 100 are also linked via various communication (or signaling) links, such as data links, to various data interfaces 135, such as TCP/IP or X.25 interfaces, for providing various network or customer services. The various signaling links 140 may be any of a plurality of communication channels or links, such as signalling system 7 links, data links, or various trunking channels.

Within this network 105, a wide variety of messages and message types may be transmitted between and among the various nodes, which are designed to provide intelligent network services. For example, upon the request of a switch 110, the various SCPs 100 may provide call handling instructions for the switch 110, while a service node 130 may provide automatic speech recognition capability. With regard to the present invention, the network 105 is only required to be capable of transmitting and receiving messages, of any kind, between and among the various nodes, such as a switch 110, an STP 120, or an SCP 100. As indicated above, the messages may be of any substantive type or kind, such as caller ID messages, calling name messages, call routing information, advanced call routing information (such as toll-free routing), account card calling, local number portability, personal numbers, and mass calling.

Figure 2:
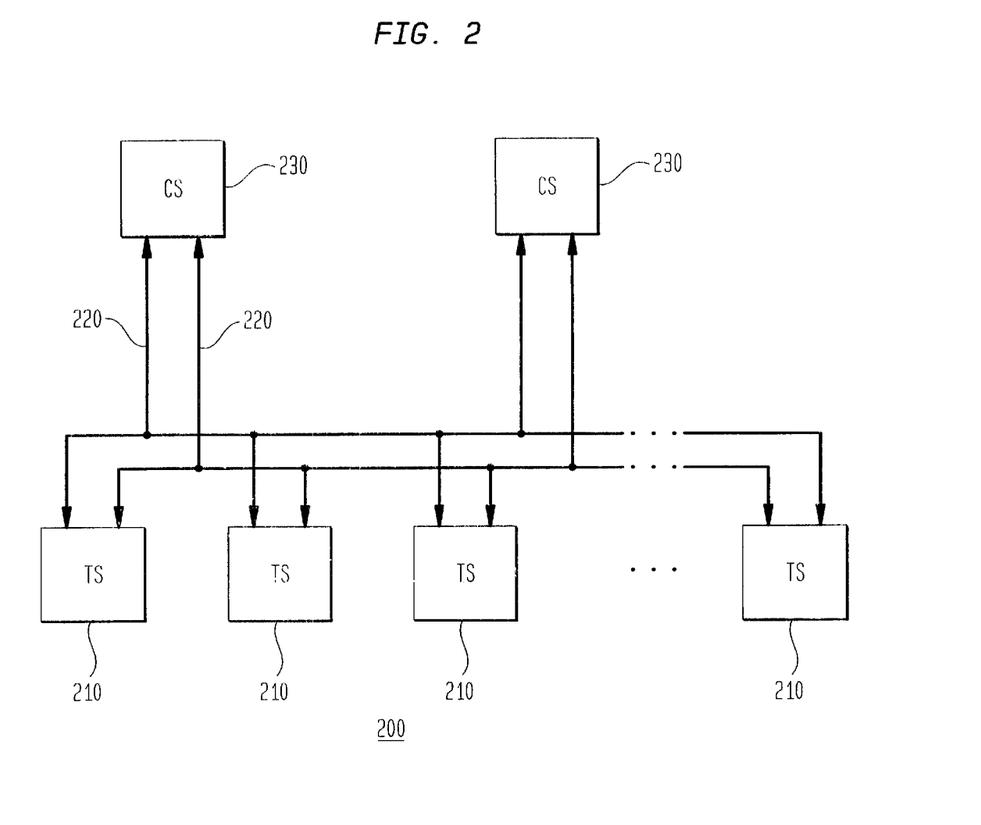
FIG. 2 is a block diagram illustrating in greater detail a system embodiment in accordance with the present invention.

FIG. 2 is a block diagram illustrating, in greater detail, a system embodiment 200 in accordance with the present invention. As mentioned above, the system 200 is preferably embodied within a service control point 100 or other node within a network 105, providing intelligent network services as a database server. Referring to FIG. 2, the preferred system 200 includes one or more control servers 230 and one or more telecommunication servers 210, which are, respectively, all connected to each other over one or more ethernets 220.

As discussed in greater detail below, in the preferred system embodiment 200, one of the control servers 230 is maintained in an active mode, while the other control server 230 is maintained in a standby mode. In addition, each of the telecommunication servers 210 may communicate with each other, or with one or more of the control servers 230, via either of the ethernets 220. In the event one of the ethernets 220 is rendered inoperable, for any reason, in accordance with the present invention communication, is automatically switched to the other ethernet 220.

Figure 3:
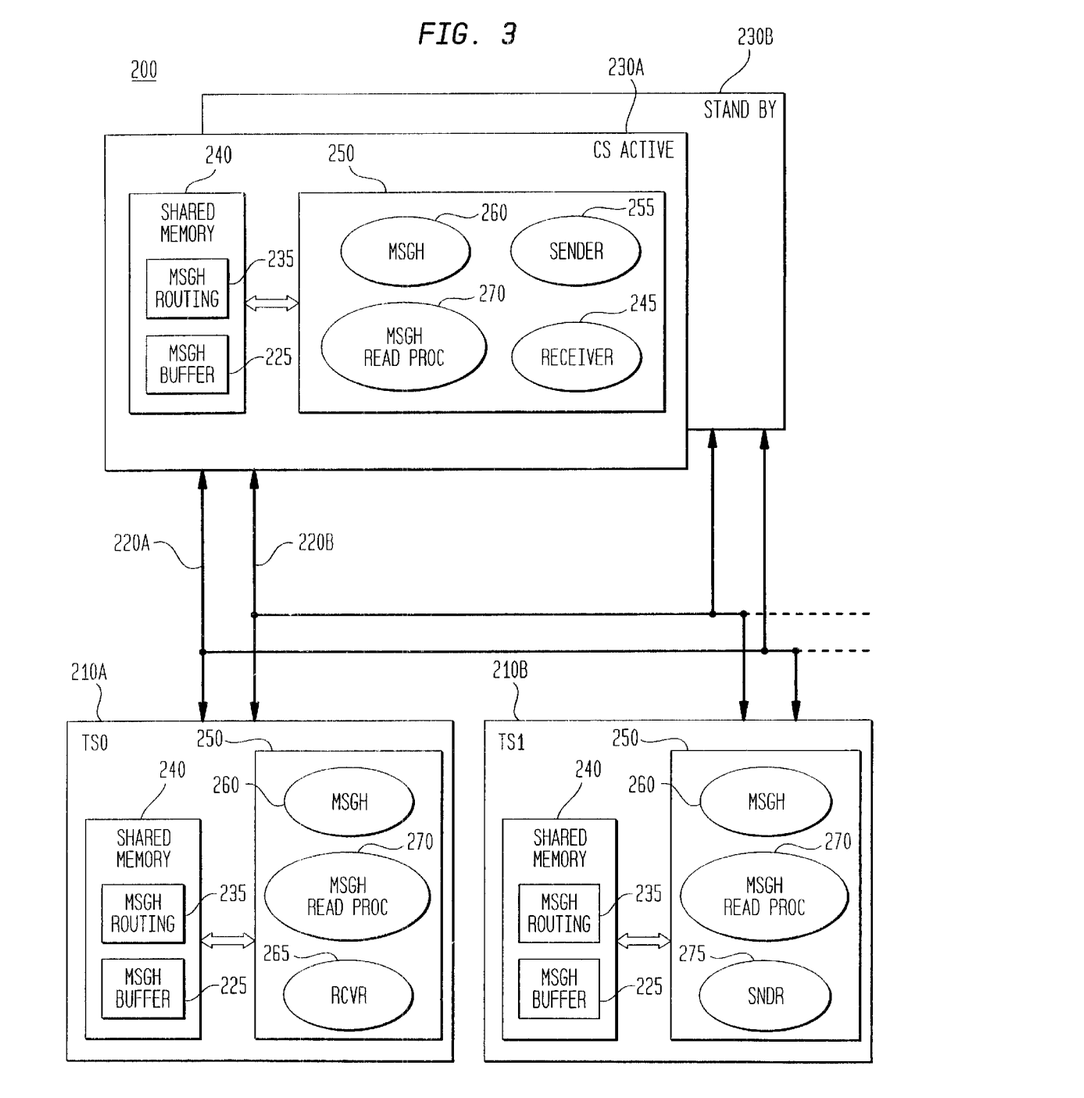
FIG. 3 is a block diagram illustrating various apparatus embodiments in accordance with the present invention.

FIG. 3 is a block diagram illustrating in greater detail the system 200, and illustrating various apparatus embodiments in accordance with the present invention, namely, the various control servers $230_A$ and $230_B$, and telecommunication servers $210_A$ and $210_B$. As illustrated in FIG. 3, the various control servers $230_A$ and $230_B$, and the various telecommunication servers $210_A$ and $210_B$, are all connected to each other over the dual ethernets $220_A$ and $220_B$. These various servers 210 and 230 may be implemented utilizing any preferred or desired servers known to those skilled in the art. In the preferred embodiment, the servers employ a UNIX operating system, although other networking operating systems may be utilized equivalently.

Continuing to refer to FIG. 3, each of the various apparatus embodiments 210 and 230 include a processor 250 connected to a shared memory 240. Within each shared memory 240 is, first, a database or table of routing information, referred to as message handling (MSGH) routing 235, and second, a message handling (MSGH) buffer 225. Various processes are implemented within each processor 250 in accordance with the present invention, namely, a message handling process 260 (referred to herein as MSGH 260), and a message handling read process 270 (MSGH READ PROC (or RPROC) 270).

The messaging system utilized in the preferred embodiments of the present invention are "name" or "mailbox" based systems, allowing each of the processors 250 to communicate with each other in a known or standard way, without requiring any further knowledge or information concerning any other processes implemented or running on these processors 250. The messaging system allows various clusters of functionality on separate computers/servers, and the processes (software) in each such computer/server are not required know if any other process (software) is on the local computer/server or on a remote computer/server. As illustrated in FIG. 3, these various names (or mailboxes) are, in the control server $230_A$, a sender 255 and a receiver 245; in the telecommunication server $210_A$, the name RCVR 265; and in the telecommunication server $210_B$, the name SNDR 275.

Continuing to refer to FIG. 3, the various processors, such as processors 250, may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, an arrangement of processors, microprocessors, controllers, or some other grouping of integrated circuits which perform the functions discussed in detail below with reference to FIGS. 4 through 7, with associated memory, such as microprocessor memory or additional RAM, ROM, EPROM or $E^2$PROM. The methodology of the invention, as discussed below with reference to FIGS. 4 through 7, may be programmed and stored in the processors 250, with their associated memory and other equivalent components, as a set of program instructions for subsequent execution when these processors 250 are operative (i.e., powered on and functioning).

The shared memories 240 within each server 210 or 230 include MSGH (message handling) routing 235 and MSGH buffers 225. The MSGH routing 235 contains routing information, including a table of names, machines (servers 210 and 230), addresses to use to send to each of the various servers 210 and 230, and information concerning what hosts (servers) exist. The MSGH buffers 225 are utilized for storage of all messages transmitted and received by each server 210 or 230.

Figure 4:
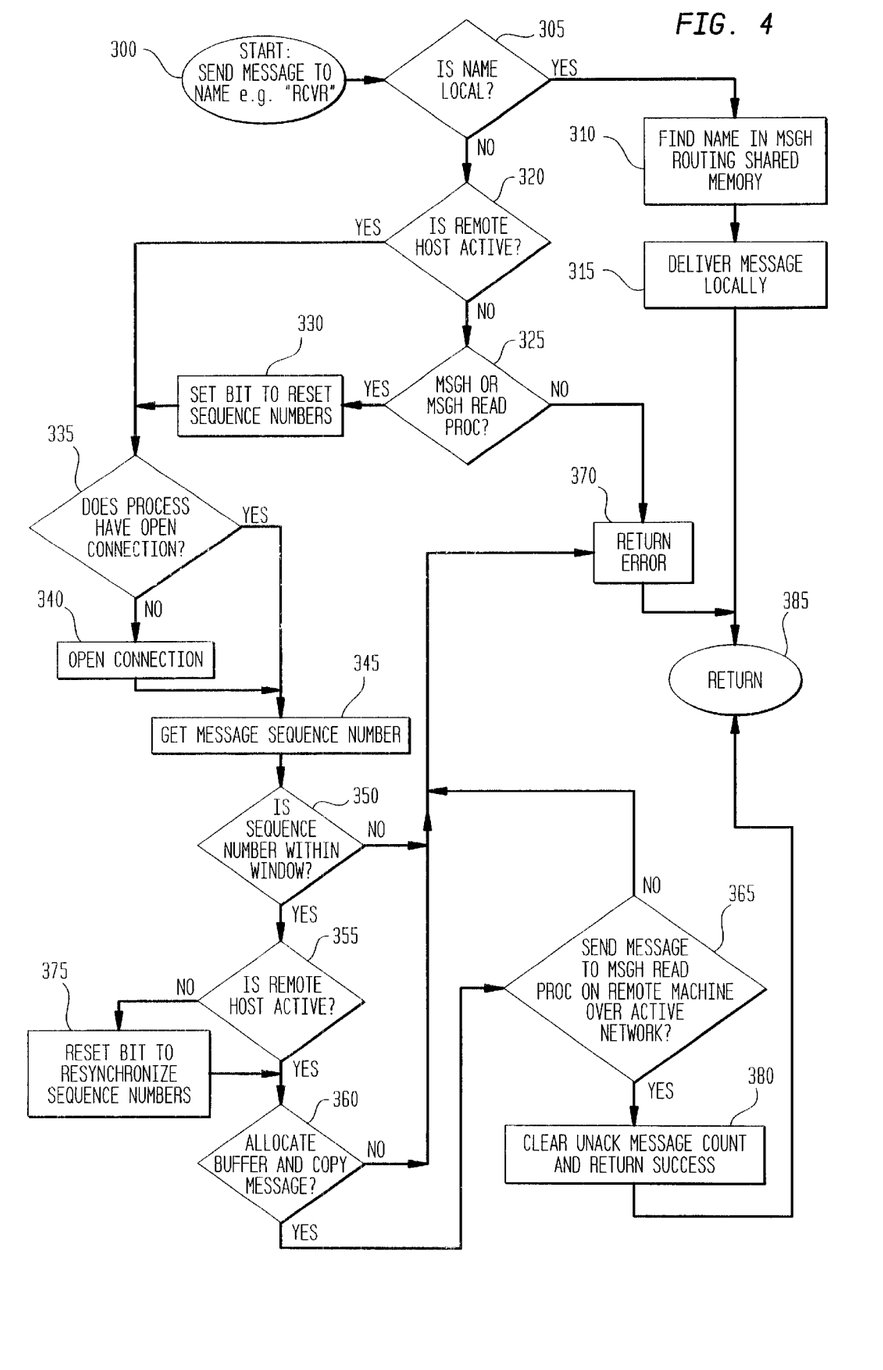
FIG. 4 is a flow diagram illustrating a transmission portion of a method embodiment in accordance with the present invention.

FIG. 4 is a flow diagram illustrating the sending or transmission portion of a protocol (method embodiment) in accordance with the present invention. Beginning with start step 300, the message beings with the sender process, within a processor 250, determining to send a message to a name of any type, such as to a name "RCVR". Next, in step 305, the method determines whether the name is local, namely whether the name resides on the same server 210 or 230, or whether the name resides on a remote (different) server 210 or 230. When the name is on the local server 210 or 230 in step 305, the method finds the name in the MSGH routing 235 of the shared memory 240, step 310, and then delivers the message locally, step 315, utilizing the local delivery mechanism, such as UNIX IPC (interprocess communication) or windows NT messaging.

When the name is not on the local server 210 or 230 in step 305, the method proceeds to step 320 and determines whether the remote host (server 210 or 230) is active. In the preferred embodiment, this is determined by examining a predetermined bit which is set to either one or zero in the MSGH routing memory 235. When the remote host is not active in step 320, the method checks if the sender process is the local message handling (MSGH) or message handling read processes (MSGH READ PROC), step 325, because in accordance with the present invention, these processes are allowed to send messages to inactive hosts. For example, the method will periodically send a message to every host (such as a connectivity check message, discussed below with reference to FIG. 7), to determine whether it is active, and preferably will receive a message back from each such active host. If in step 325 the sending process is not message handling or message handling read process, then the method returns an error message, step 370, and that portion of the method may end, return step 380.

In the preferred embodiment, message sequence numbers are maintained on a host-by-host basis. If a message is received having an out of sequence message number, the receiving host knows that there is a missing message, ie., a message it did not receive from the particular sending host having the missing message number. For example, if the receiving host has received messages 8 and 11 from a particular sending host, the receiving host automatically has knowledge that messages 9 and 10 are missing. As a consequence, for inactive remote hosts (step 320), when the sending process is the message handling or message handling read processes (step 325), the method proceeds to step 330, setting a bit to reset the sequence numbers. Because the remote host was not active in step 320, setting a bit in the message calling for resetting of sequence numbers, in step 330, will notify the remote host that in its resumption of an active state, it should resynchronize its sequence numbers for the particular sending server 210 or 230.

When the remote host is active in step 320, or following step 330, the method proceeds to step 335 and determines whether the local process has an open connection, socket or port (on the server 210 or 230). Such an open connection is usually a UDP port utilized to send messages. If the local process does not have an open connection in step 335, the method proceeds to step 340 and creates such an open connection. Following step 340, or following step 335 when the process already has an open connection, the method proceeds to step 345 and obtains a message sequence number from the MSGH routing 235 portion of shared memory 240.

As mentioned above, in the preferred embodiment, sequence numbers are utilized to determine whether all messages transmitted have in fact been received by the specified server 210 or 230. In addition, the preferred method utilizes a "window" of a maximum number of messages transmitted to a specified remote host (server 210 or 230) that have not been acknowledged, as counted or determined by their sequence numbers. In the preferred embodiment, the message "window" is a maximum of 64 unacknowledged messages. As a consequence, following obtaining a message sequence number in step 345, the method determines whether the obtained sequence number is within the preferred window. If the sequence number is not within the window in step 350, meaning that 64 (or some other predetermined number) messages have already been sent for which no acknowledgements have been received, the method proceeds to step 370 and returns an error message.

When the sequence number is within the window in step 350, the method once again determines whether the remote host is active, step 355, by examining whether the reset bit to resynchronize sequence numbers has been set. If the remote host is not active in step 355, the method proceeds to step 375 and resets the bit. Following step 375, or when the remote host is active in step 355, the method proceeds to step 360. In step 360, the method allocates buffer space, and copies the message (to be transmitted) into the designated transmit buffer, in the MSGH buffer 225 of the shared memory 240. If such buffer space cannot be allocated in step 360, the method proceeds to step 370 and returns an error message, indicating that a sufficient number of messages are outstanding to many other servers 210 and 230, such that there is currently insufficient buffering capacity. When buffer space has been allocated and the message copied into the buffer in step 360, the method sends the message to the MSGH READ PROCESS on the remote server 210 or 230 over the active ethernet 220, which has been selected based upon the connectivity portion of the method discussed in greater detail below with reference to FIG. 7. The message sent to the specified host, in the preferred embodiment, will include a message sequence number for the message being sent, as discussed above, and will include reference to a sequence number for the last message which may have been received, if any, from that specified host, as discussed in greater detail below. If the message were unable to be sent in step 365, such that the server operating system cannot transmit the message, then the message proceeds to step 370 and returns an error message.

In the preferred embodiment, when a message is received from a sending host, rather than transmitting a specific acknowledgment message back to the sending host, such an acknowledgement is subsumed within another message to be sent to that host. As mentioned above, that acknowledgement is preferably a reference to the last sequence number received from that sending host. As a consequence, in accordance with the present invention, an acknowledgement is provided to the other host without utilizing a separate and additional acknowledgement message, which would otherwise consume additional network resources and communication bandwidth. In order to keep the sending host within its message window, however, the receiving host maintains a count of the number of outstanding, unacknowledged messages received from that host. When the message was sent successfully to a particular host in step 365, which message now includes this acknowledgement of other messages which may have been received from the particular host, the method proceeds to step 380 and clears this unacknowledged message count and returns a success message, step 380. In the preferred method embodiment, the count of the number of messages received from a particular host, for which no messages or other form of acknowledgements have been transmitted back to that particular host, is maintained in the MSGH routing 235 of the shared memory 240. In step 380, that count is now cleared, because a message is being sent to that specified host. Following steps 315, 370, or 380, the transmitting portion of the method may end, return step 385.

Figure 5A:
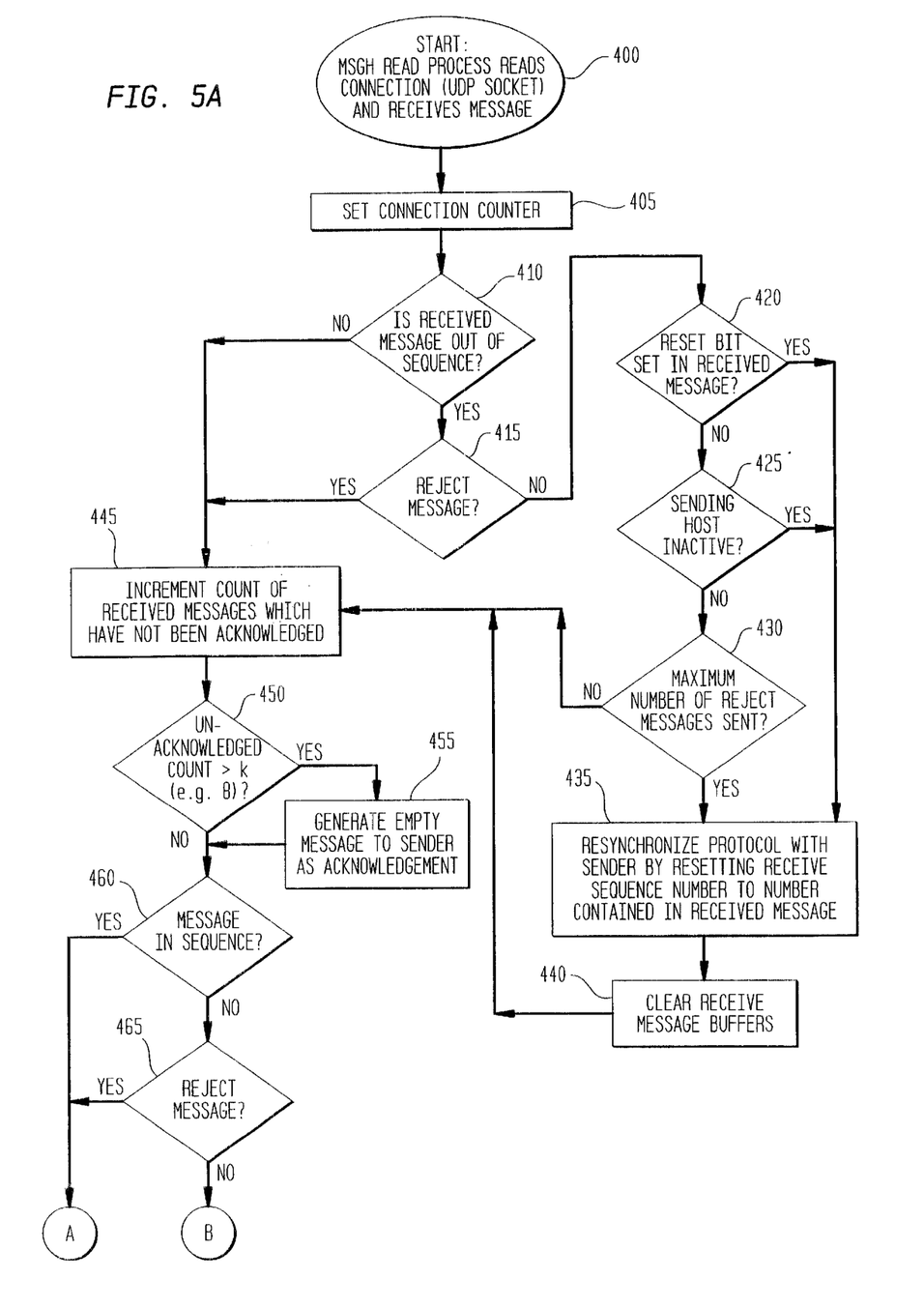
FIG. 5 is a flow diagram illustrating a receive portion of a method embodiment in accordance with the present invention.
Figure 5B:
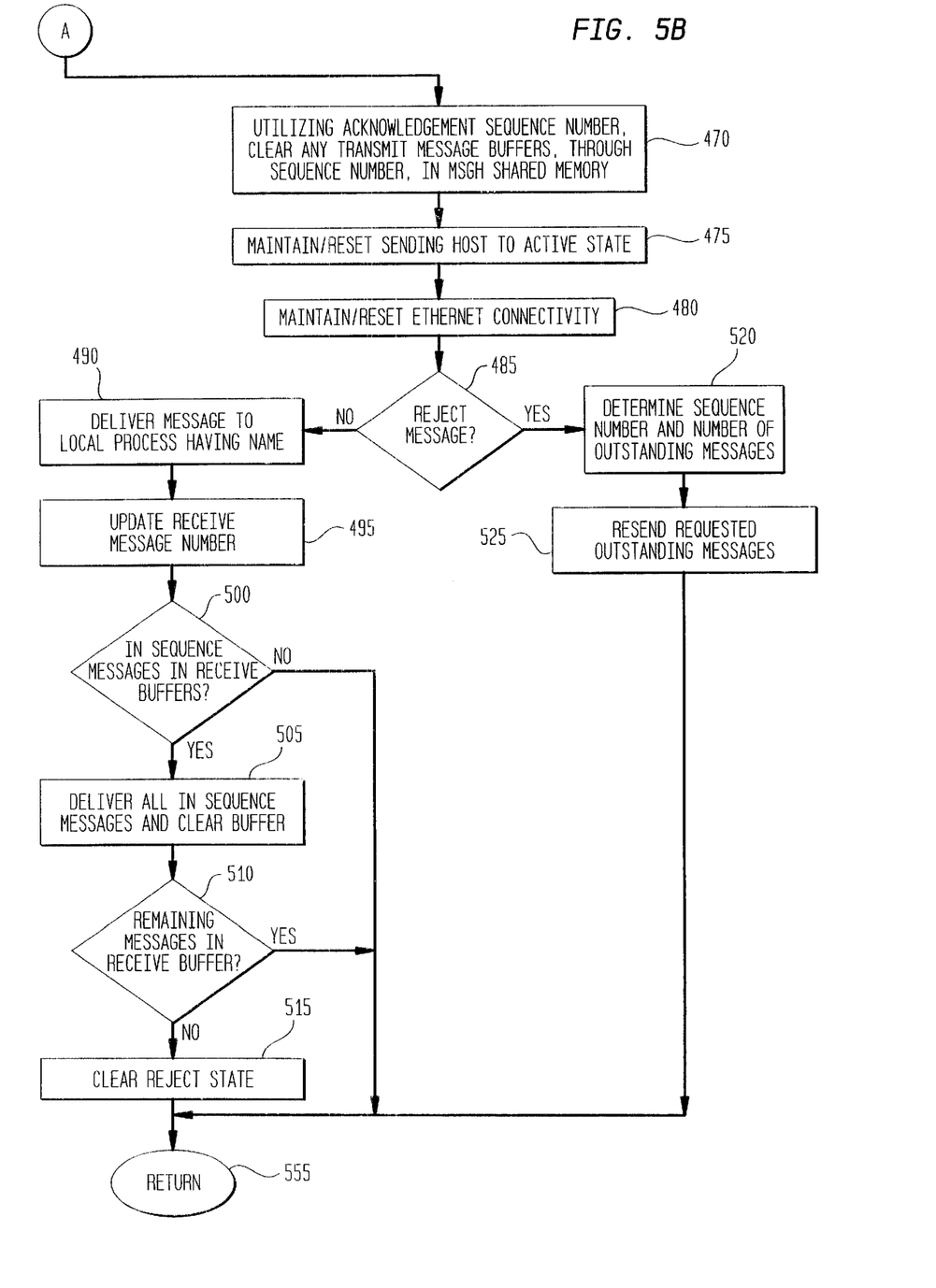
Figure 5C:
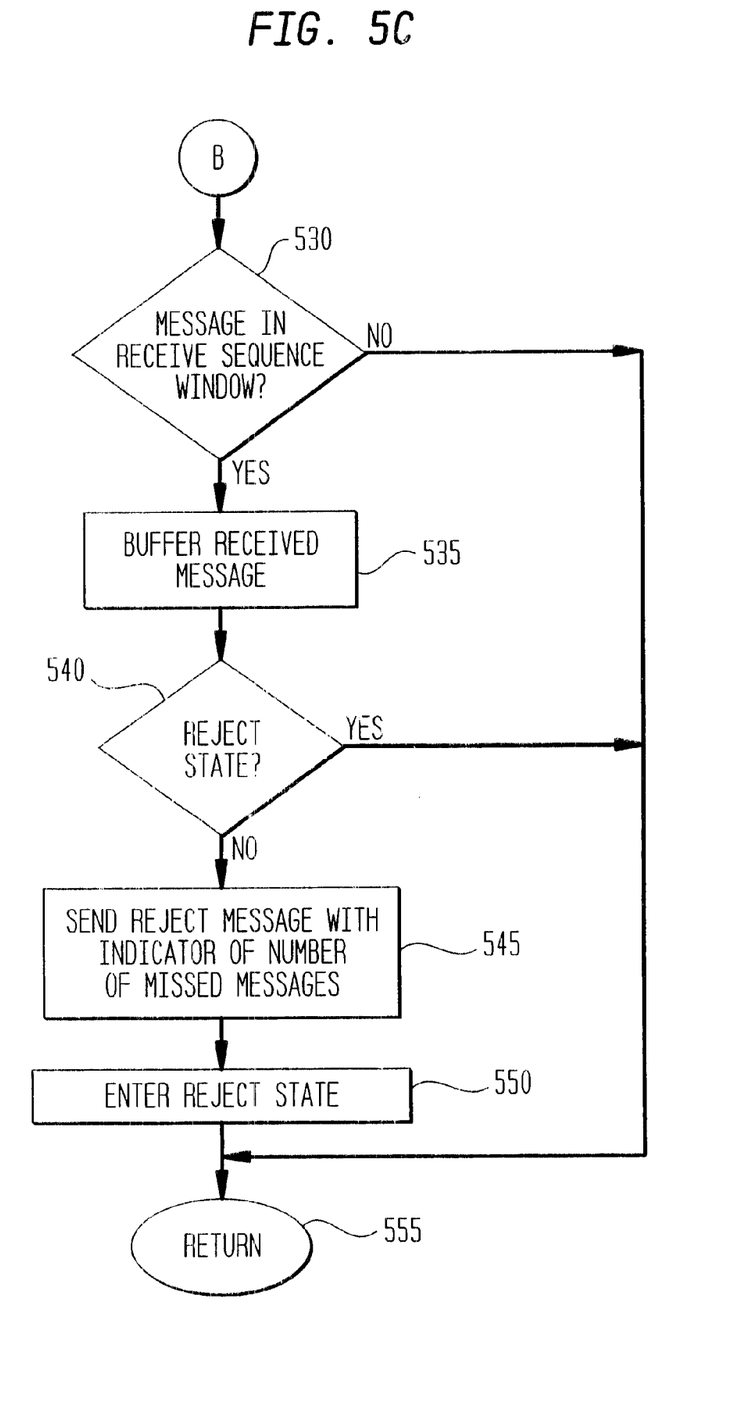

FIG. 5 is a flow diagram illustrating a receive portion of the protocol (method embodiment) in accordance with the present invention. Beginning with start step 400, the message handling read process, on the remote server, reads the connection (UDP socket) on that remote server and receives the message. The method then sets a connection counter, step 405, to track that the remote server has received a message from the particular transmitting host on an active ethernet 220, indicating both an active ethernet 220 and an active sending host. Next, in step 410, the message handling read process determines if the received message is out of sequence, step 410, as indicated by the sequence number of the received message. When the message is not out of sequence in step 410, the method proceeds to step 445. When the message is out of sequence in step 410, the method checks for certain types of messages which may have been transmitted and which, in the preferred embodiment, are allowed to be out of sequence. In these various cases discussed below, an out of sequence message is utilized to provide resynchronization between any two of the servers 210 and 230, determining that the sending and receiving servers have been trying to resume synchronization for some time and have been unable to do so. For such resynchronization, on an individual server-by-server basis, sequence numbers will be reset to the sequence number of the current message and all corresponding receive buffers will be cleared.

When the received message is out of sequence in step 410, the method first determines whether the received message is a reject message, step 415. When the received message is a reject message in step 415, the method will proceed to step 445. As discussed in greater detail below, reject messages are utilized to indicate that a number of messages have been missed or lost, and should be retransmitted.

When the received message is out of sequence in step 410 and when the received message is not a reject message in step 415, the method will determine whether any of three cases or situations exists which would indicate that resynchronization should proceed. First, in step 420, the method determines whether the reset bit is set in the received message, indicating that the receiving host should resynchronize with the sending host. When such a reset bit is set in step 420, the method proceeds to resynchronize in step 435, discussed below. When the reset bit is not set in the received message in step 420, the method proceeds to step 425, and determines whether the sending host is (was) inactive. If the sending host is (was) inactive in step 425, the method also proceeds to step 435. When the sending host is active in step 425, the method determines whether the receiving server has already sent a maximum number of reject messages to the sending host, step 430. Such a maximum number of reject messages indicates that out of sequence messages have continued to be received, even though reject messages have been sent on numerous occasions. When a maximum number of reject messages have been sent in step 430, the method avoids any further potential delay, allows for a limited degree of unreliability, by determining that all such older messages are now rendered irrelevant due to the passage of time, and may now be ignored.

As a consequence, for an out of sequence received message, when the maximum number of reject messages have been sent (in step 430), or when the sending host is inactive (in step 425), or when the reset bit has been set in the received message (in step 420), the method proceeds to step 435. In each of these three cases, the method will resynchronize the protocol with the sending host by resetting the receive sequence number to the particular number contained in the message received currently, step 435. Following step 435, in step 440, the method also clears the receive message buffers for the particular sending host. Following step 440, the method proceeds to step 445.

When a received message is in sequence in step 410, when a reject message has been received in step 425, or following steps 430 or 440, the method proceeds to step 445 and increments the count of received messages from the particular sending host which have not been acknowledged by the receiving server. As previously discussed, this count is reset to zero whenever a message is transmitted back to the particular sending host. Such a message will indicate the last message received, thereby having a dual role as both an acknowledgement and as an independent message. In the event that such independent messages which also contain such an acknowledgement have not been transmitted for some time, such that the unacknowledged count is greater than a predetermined number, such as 8, in step 450, the method will proceed to step 455 and generate an otherwise empty message to the sender as an acknowledgement. When the unacknowledged count is not greater than such a predetermined number in step 450, the method proceeds to step 460.

In steps 460 and 465, the method determines, without the other conditions of steps 420, 425 and 430, whether the received message is in sequence, step 460, or whether the received message is a reject message, step 465. As discussed in greater detail below, when the message is in sequence in step 460, the message will be delivered locally within the receiving server, proceeding to step 470. When the message is a reject message in step 465, indicating that the sending host has a message outstanding which it needs to receive, the method also proceeds to step 470, to ultimately resend the requested outstanding messages (in steps 520 and 525, discussed below). When the message is not in sequence in step 460, and when the received message is not a reject message in step 465, the method proceeds to step 530 to provide storage for the received message and to enter a reject state, in order to subsequently transmit a reject message to the sender, to indicate the existence of one or more outstanding (missed) messages.

When the message is not in sequence in step 460 and is not a reject message in step 465, the method proceeds to step 530 and determines if the received message is within the receive window. In the preferred embodiment, there are 128 possible sequence numbers utilized. At any one time, the receiving server should only receive messages having sequence number within a range or window of 64 of such sequence numbers. If the sequence number of the received message is not within the window in step 530, that message is ignored, based upon the presumption that the currently received message is a retransmission or a multiple transmission of a message which had already been received previously. For example, a reject message may have been sent previously, followed by a retransmission, and under certain circumstances, there may be multiple such retransmissions. As a consequence, when the sequence number of the received message is not within the receive window in step 530, the received message is ignored, and the method may end, return step 555.

When the sequence number of the received message is within the receive sequence window, in step 530, and, as discussed above, is not in sequence (step 460), the received message is buffered in a receive buffer, step 535, such as MSGH buffer 225. The method then determines whether the receiving host is already in a reject state for that particular sending host. If the receiving server is already in a reject state for the particular sending host, in the preferred embodiment, the method avoids any continual or additional sending of reject messages and as a consequence, the method may end, return step 555. When the receiving host is not already in a reject state for the particular sending host in step 540, the method proceeds to step 545 and immediately sends a reject message. Such a reject message includes an indicator of the number of outstanding messages and the sequence number of the message just received. For example, if the sequence number of the received message is 89, and the last previous message has a sequence number of 86, the reject message will include an indication that 89 was the last sequence number received, and that two messages are missing, namely, 87 and 88. Following sending of such a reject message, the receiving server enters the reject state for the particular sending host, step 550, as discussed in greater detail below with respect to FIG. 6, and this portion of the receiving method may end, return step 555.

When the message received is in sequence in step 460, or is a reject message in step 465, the method proceeds to step 470, and examines the received message. More particularly, utilizing the acknowledgement sequence number contained in the received message, as discussed above, which indicates that the particular sending host itself has properly received messages previously transmitted from the server 210 or 230, the method clears any transmit message buffers of the MSGH buffer 225 (in the shared memory 240) which had been storing (for possible retransmission) previously transmitted messages, through that sequence number. The sending host is then maintained or reset to an active state, step 475, and the ethernet connectivity counter is maintained or reset, indicating that a valid message may be received from the sending host over the particular ethernet connection ($220_A$ or $220_B$), step 480 (and discussed in greater detail below with reference to FIG. 7). Next, for reject messages in step 485, the method proceeds to step 520, while for in sequence messages which are not reject messages in step 485, the method proceeds to step 490.

For reject messages in step 485, the method then determines the sequence number (of the last message received) and the number of outstanding messages, as indicated in the received message, step 520. The method then resends the requested outstanding messages, step 525.

For in sequence messages which are not reject messages in step 485, the method proceeds to step 490 and delivers the received message to the local process having the designated name, utilizing the server operating system (precisely as in step 315 with regard to local sending of messages). Following step 490, the method updates the received message count from the particular sending host, incrementing it by one, step 495. The method then examines the receive buffers, to determine whether there are previously out of sequence messages, which are now are in sequence messages, being stored in the receive buffer, step 500. When there are in sequence messages stored in the receive buffer in step 500, the method then delivers all in sequence messages and clears those portions of the receive buffer, step 505. When there are no additional remaining messages in the receive buffer in step 510, the method clears the reject state, step 515, as the sending and receiving servers are in synchrony and caught up with each other. Following step 515, or when there are remaining messages in the receive buffer in step 510, or when there are no in sequence messages in the receive buffer in step 500, the receive portion of the method may end, return step 555.

Figure 6:
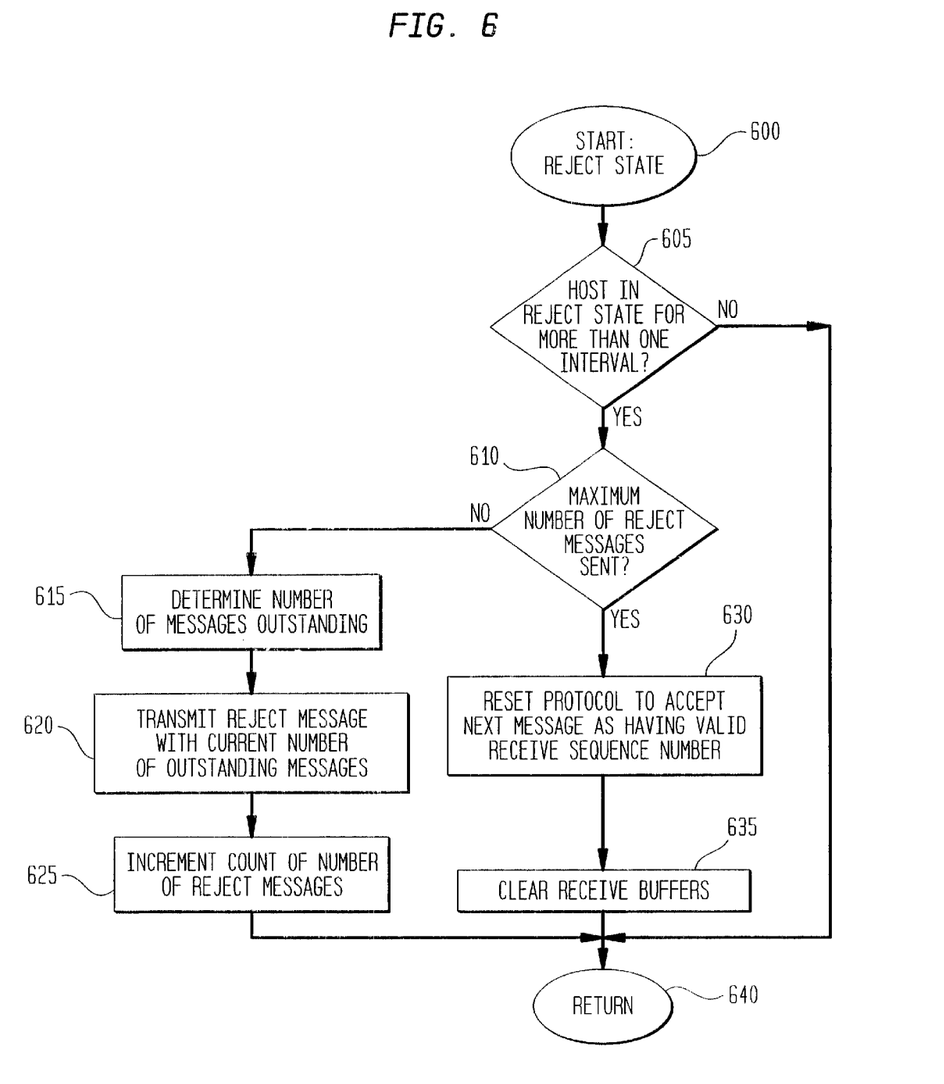
FIG. 6 is a flow diagram illustrating a reject state portion of a method embodiment in accordance with the present invention.

FIG. 6 is a flow diagram illustrating a reject state portion of the protocol (method embodiment) in accordance with the present invention. The reject state is entered, step 600, from step 550 discussed above. In the reject state, at predetermined intervals, such as every 300 ms in the preferred embodiment, the method determines, for each sending server, whether the server is in a reject state for that particular sending server (indicating one or more out of sequence messages received from that particular sending server). The method first determines whether it has been in a reject state for the particular sending host for more than one interval, as the reject state was immediately entered upon completion of step 550, and additional reject messages do not need to be sent without an intervening period of time. When the receiving host has been in a reject state for a particular host for more than one interval in step 605, the method determines whether a predetermined maximum number of reject messages have been sent, step 610. In the preferred embodiment, in which resynchronization should occur within approximately 2 seconds or less, a maximum number of reject messages is generally 7 or 8. When a maximum number of reject messages have not been sent in step 610, the method proceeds to step 615 and determines the number of messages outstanding. The method then transmits a reject message with an indicator of the current number of outstanding messages and the sequence number of the last received message. The method then increments the count of the number of reject messages, step 625, and the reject state portion of the method may end, return step 650.

When the maximum number of reject messages have been sent in step 610, the method will resynchronize the protocol with the next message, step 630. The protocol is reset to accept the next message as having a valid receive sequence number, step 630, and all receive buffers are cleared, step 635. Under these circumstances, the sending and receiving servers have been out of synchrony for a predetermined maximum period of time. To avoid any further delays, in accordance with the present invention, the various servers then resynchronize by both designating that the next message automatically has a valid receive sequence number, and clearing or freeing their receive buffers. Following step 625 or 635, the reject state portion of the method may end, return step 640.

Figure 7:
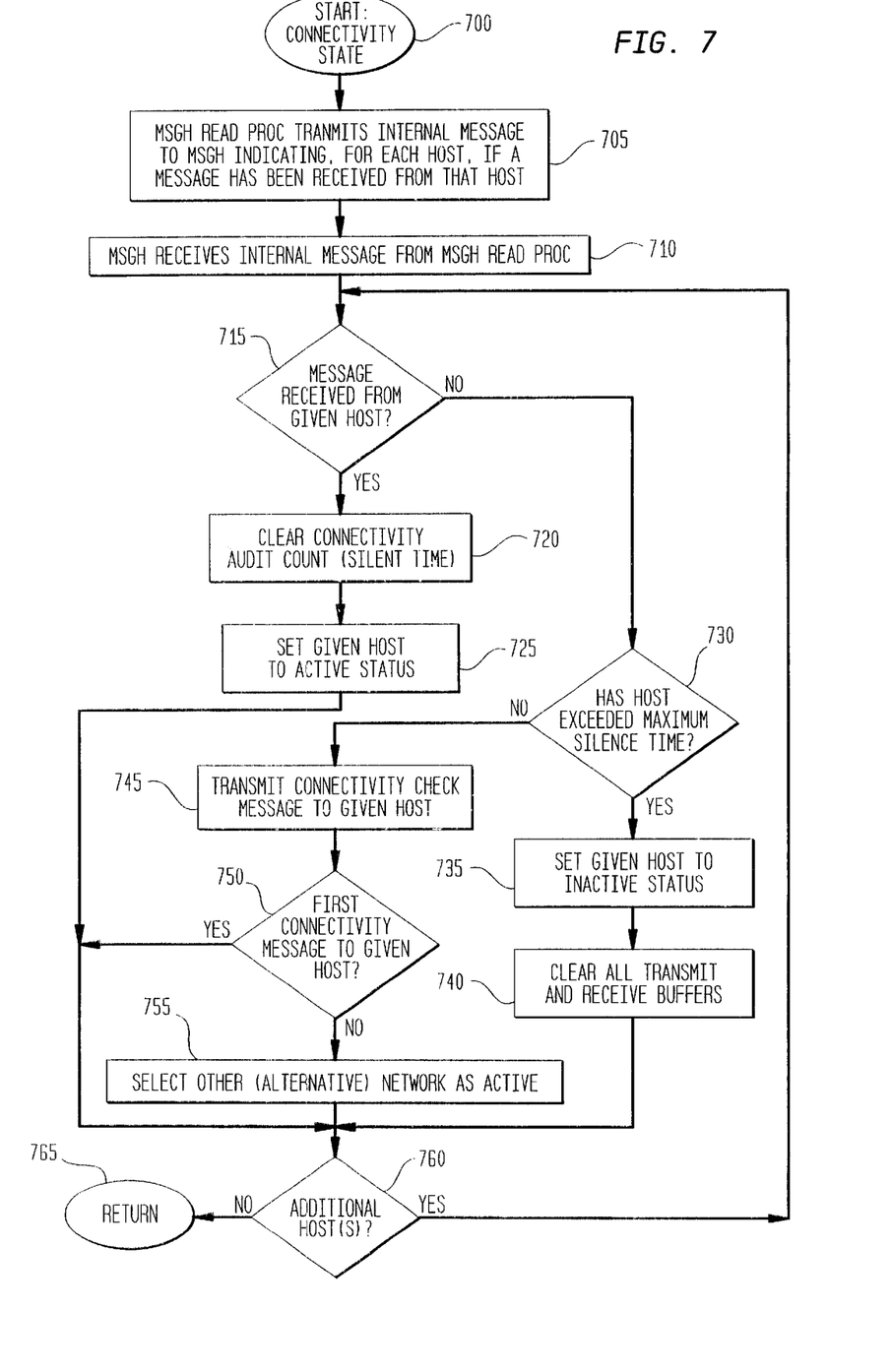
FIG. 7 is a flow diagram illustrating a connectivity state portion of a method embodiment in accordance with the present invention.

FIG. 7 is a flow diagram illustrating a connectivity state portion of the protocol (method embodiment) in accordance with the present invention. This connectivity state part of the protocol is utilized to select or switch between ethernets $220_A$ and $220_B$, and to determine whether a given server 210 or 230 is active or inactive. As discussed in greater detail below, the method determines whether a message has been received from a given server within a predetermined period of time or, in other terms, whether the given server has been silent for a predetermined maximum period of time. In the preferred embodiment, such time periods are determined utilizing a counter referred to as a connectivity count, such that the connectivity count is increased when no messages have been received during a given interval. If the given server has been silent during the interval, the method may attempt to communicate with that server and, if unsuccessful, switch ethernet connections, and try again during the next interval. If the given server has not responded to these communications over either ethernet and thereby has continued to be silent for the predetermined maximum period of time (as determined by the connectivity count reaching a predetermined maximum value), the given server is determined to be nonfunctional and is given an inactive status.

Beginning with start step 700, the method enters a connectivity state at predetermined intervals. In the preferred embodiment, the connectivity state portion of the protocol is executed by the message handling read process 270 in a processor 250. The MSGH read process 270 transmits an internal message to the MSGH 260 indicating, for each server (host), if a message has been received from that server (host), step 705. The MSGH 260 receives this internal message from the MSGH read process 270, step 710 and, as discussed in greater detail below, loops through the message on a per server basis, examining the message as pertaining to each given or specific host.

The method first determines whether a message has been received from a given host during the predetermined interval, step 715. If a message has been received from that given host in step 715, the method clears the connectivity count (the silent time parameter), as the given host has not been silent during the interval, step 720, and sets the status of the given host to an active status, step 725. If a message has not been received from the given host in step 715, the method determines in step 730 if the particular host has exceeded its maximum time of silence, as indicated by its connectivity count reaching a predetermined maximum value. If in step 730 the maximum silent time has been exceeded, the method proceeds to step 735 and sets the status of the given host to an inactive status, step 735, indicating that the particular host may be inoperative. The method then clears all transmit and receive buffers pertaining to that particular host, step 740, and proceeds to step 760.

When a message has not been received from the given host (step 715), and when the given host has not exceeded its maximum silent time (step 730), the method transmits a connectivity check message (or connect message) to the given host, step 745. In the preferred embodiment, this connectivity check message is a particular message requesting the given host to transmit any kind or type of message back to the processing server. If the given host does not respond to this connectivity check message, it may be presumed either that the given host has become inoperative, or that the ethernet connection may have become inoperative. Following step 745, the method determines whether this is the first connectivity check message to the given host, step 750. When the connectivity check message is the first message sent to the given host in step 750, the method may proceed to step 760.

A significant feature of the various embodiments of the present invention is the ability to automatically detect various hardware failures, such as the loss of one of the ethernets $220_A$ or $220_B$, and to automatically re-route traffic onto the other, remaining ethernet $220_B$ or $220_A$, respectively. When the connectivity message is not the first connectivity message sent to the given host in step 750, the method will switch the ethernet connection utilized to communicate with the given host, selecting the other (alternative) network as active, step 755, i.e., switching or toggling between ethernet $220_A$ and ethernet 220. In this way, so long as one of the two ethernets 220 is operative, a server 210 or 230 connected to that ethernet will receive a connectivity check message and, if operative, respond to the message and retain its active status in accordance with the present invention. In addition, in the event that one of the two ethernets 220 is disabled, utilizing this connectivity state routine in the preferred embodiment, each server 210 or 230 will automatically switch to the remaining active ethernet. As a consequence, in accordance with the present invention, a hardware failure will automatically be detected, and traffic will be correspondingly re-routed.

Following step 725, step 740 and step 755, the method determines if additional hosts should be examined, step 760. When there are additional hosts for which connectivity is to be checked in step 760, the method returns to step 715. When there are no more remaining hosts requiring connectivity checks, in step 760, the method may end, return step 765.

As may be apparent from the above discussion, there are numerous advantages of the various embodiments of the present invention. As mentioned above, hardware failures are automatically detected, such as a loss of an ethernet, with traffic correspondingly re-routed.

Another one of the most significant advantages of the present invention is the intermediate level of reliability and low delay characteristics provided by the various embodiments, which are especially suited for real-time applications such as internet telephony. Resynchronizations may occur to avoid undue delays in message transmission and reception, while message buffering reduces message loss. Such resynchronization, including clearing buffers and resetting sequence numbers, occurs while the protocol is maintained as up and valid, with ongoing communication, rather than the prior art loss of the connection.

In addition, the various embodiments of the invention utilize a connectionless, semi-reliable message transport while simultaneously maintaining the higher level of reliability associated with connection oriented protocols. Unlike connectionless protocols, however, in the preferred embodiment, the sender will be notified of undeliverable messages, and the protocol will maximize accurate delivery within its time constraints.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for an intermediate reliability protocol for network message transmission and reception, the method comprising:

(a) receiving a message;

(b) when the received message has a sequence number which is out of sequence, determining whether a reset bit is set and, when the reset bit is set, resynchronizing to the received message;

(c) when the received message has a sequence number which is out of sequence, determining whether the transmitting host is inactive and, when the transmitting host is inactive, resynchronizing to the received message; and (d) when the received message has a sequence number which is out of sequence, determining whether a predetermined number of transmit reject messages have been transmitted and, when the predetermined number of transmit reject messages have been transmitted, resynchronizing to the received message.

2. The method of claim 1, further comprising:

(e) when the received message is a received reject message, retransmitting an outstanding transmitted message.

3. The method of claim 2, wherein the received reject message designates a sequence number of a last received message and designates a number of outstanding messages.

4. The method of claim 1, wherein resynchronizing to the received message further comprises resynchronizing to the sequence number of the received message.

5. The method of claim 1, wherein resynchronizing to the received message further comprises clearing receive buffers.

6. The method of claim 1, wherein the resynchronizing is limited to a designated transmitting server of a plurality of servers.

7. The method of claim 1, further comprising:

when the received message has a sequence number which is out of sequence, transmitting a transmit reject message without resynchronizing.

8. The method of claim 7, wherein the transmit reject message includes a designation of a number of messages outstanding.

9. The method of claim 7, further comprising:

incrementing a count of transmit reject messages.

10. The method of claim 9, further comprising:

when the count of transmit reject message is equal to the predetermined number of transmit reject messages, accepting a next received message as having a valid sequence number and resynchronizing to the next received message.

11. The method of claim 1, further comprising:

when the received message has a sequence number which is out of sequence, buffering the received message.

12. The method of claim 1, further comprising:

when the received message has a sequence number which is out of sequence, and when the sequence number is not within a receive sequence window, ignoring the received message.

13. The method of claim 1, further comprising:
when the received message has a sequence number which is in sequence, delivering the received message to a designated local process.

14. The method of claim 1, further comprising:
when the received message has a sequence number which is in sequence, clearing transmit buffers of any messages through an acknowledgement sequence number.

15. The method of claim 1, further comprising:
when the received message has a sequence number which is in sequence, setting a status of a transmitting server as active.

16. The method of claim 1, further comprising:
when the received message has a sequence number which is in sequence, designating a network connection as active.

17. The method of claim 1, further comprising:
when the received message has a sequence number which is in sequence, delivering to a local process a previously received message having a sequence number which is now in sequence.

18. The method of claim 17, further comprising:
clearing a receive buffer of the previously received message.

19. The method of claim 1, further comprising:
when the received message has a sequence number which is in sequence, incrementing a count of received unacknowledged messages.

20. The method of claim 19, further comprising:
when the count of received unacknowledged messages is greater than a predetermined number of received unacknowledged messages, transmitting a message as an acknowledgement.

21. The method of claim 1, further comprising:
transmitting a message having a next sequence number of a plurality of sequence numbers.

22. The method of claim 21, wherein the transmitted message further contains an acknowledgement of a sequence number of a most recently received message.

23. The method of claim 21, wherein the transmitted message further contains a reset bit which is set.

24. The method of claim 1, further comprising:
when a message has not been received from a designated server of a plurality of servers during a first predetermined period of time, transmitting a first connectivity message to the designated server over a first network.

25. The method of claim 24, further comprising:
when a response message has not been received from the designated server during a second predetermined period of time, transmitting a second connectivity message to the designated server over a second network.

26. The method of claim 25, further comprising:
when a response message has not been received from the designated server during a third predetermined period of time, setting a status of the designated server as inactive.

27. The method of claim 26, further comprising:
clearing all transmit buffers and all receive buffers pertaining to the designated server.

28. The method of claim 1, further comprising:
maintaining a valid protocol state during resynchronization.

29. An apparatus for an intermediate reliability protocol for network message transmission and reception, the apparatus coupleable to a network for message transmission and reception, the apparatus comprising:
a shared memory; and
a processor coupled to the shared memory, wherein the processor, when operative, includes program instructions to receive a message; when the received message has a sequence number which is out of sequence, the processor having further instructions to determine whether a reset bit is set and, when the reset bit is set, to resynchronize to the received message; when the received message has a sequence number which is out of sequence, the processor having further instructions to determine whether the transmitting host is inactive and, when the transmitting host is inactive, to resynchronize to the received message; and when the received message has a sequence number which is out of sequence, the processor having further instructions to determine whether a predetermined number of transmit reject messages have been transmitted and, when the predetermined number of transmit reject messages have been transmitted, to resynchronize to the received message.

30. The apparatus of claim 29, wherein the processor has further instructions, when the received message is a received reject message, to retransmit an outstanding transmitted message.

31. The apparatus of claim 30, wherein the received reject message designates a sequence number of a last received message and designates a number of outstanding messages.

32. The apparatus of claim 29, wherein the processor has further instructions to resynchronize to the sequence number of the received message.

33. The apparatus of claim 29, wherein the processor has further instructions to clear receive buffers in the shared memory during resynchronization.

34. The apparatus of claim 29, wherein the processor has further instructions to limit resynchronization to a designated transmitting server of a plurality of servers.

35. The apparatus of claim 29, wherein the processor has further instructions, when the received message has a sequence number which is out of sequence, to transmit a transmit reject message without resynchronizing.

36. The apparatus of claim 35, wherein the transmit reject message includes a designation of a number of messages outstanding.

37. The apparatus of claim 35, wherein the processor has further instructions to increment a count of transmit reject messages.

38. The apparatus of claim 37, wherein the processor has further instructions, when the count of transmit reject messages is equal to the predetermined number of transmit reject messages, to accepting a next received message as having a valid sequence number and to resynchronize to the next received message.

39. The apparatus of claim 29, wherein the processor has further instructions, when the received message has a sequence number which is out of sequence, to buffer the received message in the shared memory.

40. The apparatus of claim 29, wherein the processor has further instructions, when the received message has a sequence number which is out of sequence, and when the sequence number is not within a receive sequence window, to ignore the received message.

41. The apparatus of claim 29, wherein the processor has further instructions, when the received message has a sequence number which is in sequence, to deliver the received message to a designated local process.

42. The apparatus of claim 29, wherein the processor has further instructions, when the received message has a sequence number which is in sequence, to clear transmit buffers, in the shared memory, of any messages through an acknowledgement sequence number.

43. The apparatus of claim 29, wherein the processor has further instructions, when the received message has a sequence number which is in sequence, to set a status of a transmitting server as active.

44. The apparatus of claim 29, wherein the processor has further instructions, when the received message has a sequence number which is in sequence, to designate a network connection as active.

45. The apparatus of claim 29, wherein the processor has further instructions, when the received message has a sequence number which is in sequence, to deliver to a local process a previously received message having a sequence number which is now in sequence.

46. The apparatus of claim 45, wherein the processor has further instructions to clear a receive buffer in the shared memory of the previously received message.

47. The apparatus of claim 29, wherein the processor has further instructions, when the received message has a sequence number which is in sequence, to increment a count of received unacknowledged messages.

48. The apparatus of claim 47, wherein the processor has further instructions, when the count of received unacknowledged messages is greater than a predetermined number of received unacknowledged messages, to transmit a message as an acknowledgement.

49. The apparatus of claim 29, wherein the processor has further in instructions to transmit a message having a next sequence number of a plurality of sequence numbers.

50. The apparatus of claim 49, wherein the transmitted message further contains an acknowledgement of a sequence number of a most recently received message.

51. The apparatus of claim 49, wherein the transmitted message further contains a reset bit which is set.

52. The apparatus of claim 29, wherein the processor has further instructions, when a message has not been received from a designated server of a plurality of servers during a first predetermined period of time, to transmit a first connectivity message to the designated server over a first network.

53. The apparatus of claim 52, wherein the processor has further instructions, when a response message has not been received from the designated server during a second predetermined period of time, to transmit a second connectivity message to the designated server over a second network.

54. The apparatus of claim 53, wherein the processor has further instructions, when a response message has not been received from the designated server during a third predetermined period of time, to set a status of the designated server as inactive.

55. The apparatus of claim 54, wherein the processor has further instructions to clear all transmit buffers and all receive buffers in the shared memory pertaining to the designated server.

56. The apparatus of claim 29, wherein the processor has further instructions to maintain a valid protocol state during resynchronization.

57. A system for an intermediate reliability protocol for network message transmission and reception, the system comprising:

a first server, wherein the first server, when operative, includes program instructions to transmit a message; and a second server coupled to the first server over a plurality of networks, wherein the second server, when operative, includes program instructions to receive the message; when the received message has a sequence number which is out of sequence, the second server having further instructions to determine whether a reset bit is set and, when the reset bit is set, to resynchronize to the received message; when the received message has a sequence number which is out of sequence, the second server having further instructions to determine whether the first server is inactive and, when the first server is inactive, to resynchronize to the received message; and when the received message has a sequence number which is out of sequence, the second server having further instructions to determine whether a predetermined number of transmit reject messages have been transmitted to the first server and, when the predetermined number of transmit reject messages have been transmitted to the first server, to resynchronize to the received message.

58. The system of claim 57, wherein the second server has further instructions, when the received message is a received reject message, to retransmit an outstanding transmitted message to the first server.

59. The system of claim 58, wherein the received reject message designates a sequence number of a last received message and designates a number of outstanding messages.

60. The system of claim 57, wherein the second server has further instructions to resynchronize to the sequence number of the received message.

61. The system of claim 57, wherein the second server has further instructions to clear receive buffers in a shared memory of the second server during resynchronization.

62. The system of claim 57, further comprising a plurality of servers coupled to the first server and to the second server over the plurality or networks, and wherein the second server has further instructions to limit resynchronization to a designated transmitting server of the plurality of servers.

63. The system of claim 57, wherein the second server has further instructions, when the received message has a sequence number which is out of sequence, to transmit a transmit reject message to the first server without resynchronizing.

64. The system of claim 63, wherein the transmit reject message includes a designation of a number of messages outstanding.

65. The system of claim 63, wherein the second server has further instructions to increment a count of transmit reject messages.

66. The system of claim 65, wherein the second server has further instructions, when the count of transmit reject messages is equal to the predetermined number of transmit reject messages, to accepting a next received message as having a valid sequence number and to resynchronize to the next received message.

67. The system of claim 57, wherein the second server has further instructions, when the received message has a sequence number which is out of sequence, to buffer the received message in a shared memory of the second server.

68. The system of claim 57, wherein the second server has further instructions, when the received message has a sequence number which is out of sequence, and when the sequence number is not within a receive sequence window, to ignore the received message.

69. The system of claim 57, wherein the second server has further instructions, when the received message has a sequence number which is in sequence, to deliver the received message to a designated local process within the second server.

70. The system of claim 57, wherein the second server has further instructions, when the received message has a sequence number which is in sequence, to clear transmit buffers, in a shared memory of the second server, of any messages through an acknowledgement sequence number.

71. The system of claim 57, wherein the second server has further instructions, when the received message has a sequence number which is in sequence, to set a status of the first server as active.

72. The system of claim 57, wherein the second server has further instructions, when the received message has a sequence number which is in sequence, to designate a network of the plurality of networks as active.

73. The system of claim 57, wherein the second server has further instructions, when the received message has a sequence number which is in sequence, to deliver to a local process within the second server a previously received message having a sequence number which is now in sequence.

74. The system of claim 45, wherein the second server has further instructions to clear a receive buffer in a shared memory of the second server of the previously received message.

75. The system of claim 57, wherein the second server has further instructions, when the received message has a sequence number which is in sequence, to increment a count of received unacknowledged messages.

76. The system of claim 57, wherein the second server has further instructions, when the count of received unacknowledged messages is greater than a predetermined number of received unacknowledged messages, to transmit a message to the first server as an acknowledgement.

77. The system of claim 57, wherein the second server has further instructions to transmit a message to the first server having a next sequence number of a plurality of sequence numbers.

78. The system of claim 77, wherein the transmitted message further contains an acknowledgement of a sequence number of a most recently received message.

79. The system of claim 77, wherein the transmitted message further contains a reset bit which is set.

80. The system of claim 57, wherein the second server has further instructions, when a message has not been received from the first server during a first predetermined period of time, to transmit a first connectivity message to the first server over a first network of the plurality of networks.

81. The system of claim 80, wherein the second server has further instructions, when a response message has not been received from the first server during a second predetermined period of time, to transmit a second connectivity message to the first server over a second network of the plurality of networks.

82. The system of claim 81, wherein the second server has further instructions, when a response message has not been received from the first server during a third predetermined period of time, to set a status of the first server as inactive.

83. The system of claim 82, wherein the second server has further instructions to clear all transmit buffers and all receive buffers, in a shared memory of the second server, pertaining to the first server.

84. The system of claim 57, wherein the second server has further instructions to maintain a valid protocol state with the first server during resynchronization.

85. The system of claim 57 wherein the plurality of networks are two ethernets.

86. A system for an intermediate reliability protocol for network message transmission and reception, the system comprising:

a plurality of networks; and a plurality of servers, each server of the plurality of servers coupled to each other server of the plurality of servers over the plurality of networks, the plurality of servers including a first server and a second server, wherein the first server, when operative, includes program instructions to transmit a message; and wherein the second server, when operative, includes program instructions to receive the message; when the received message has a sequence number which is out of sequence, the second server having further instructions to determine whether a reset bit is set and, when the reset bit is set, to resynchronize to the received message; when the received message has a sequence number which is out of sequence, the second server having further instructions to determine whether the first server is inactive and, when the first server is inactive, to resynchronize to the received message; and when the received message has a sequence number which is out of sequence, the second server having further instructions to determine whether a predetermined number of transmit reject messages have been transmitted to the first server and, when the predetermined number of transmit reject messages have been transmitted to the first server, to resynchronize to the received message.

87. The system of claim 86, wherein the second server has further instructions, when the received message is a received reject message, to retransmit an outstanding transmitted message to the first server.

88. The system of claim 86, wherein the resynchronization to the received message includes resynchronization to the sequence number of the received message and clearing receive buffers in a shared memory of the second server.

89. The system of claim 86, wherein the second server has further instructions, when the received message has a sequence number which is out of sequence, to transmit a transmit reject message to the first server without resynchronizing and to increment a count of transmit reject messages; and when the count of transmit reject messages is equal to the predetermined number of transmit reject messages, to accepting a next received message as having a valid sequence number and to resynchronize to the next received message.

90. The system of claim 86, wherein the second server has further instructions, when the received message has a sequence number which is out of sequence, to buffer the received message in a shared memory of the second server.

91. The system of claim 86, wherein the second server has further instructions, when a message has not been received from the first server during a first predetermined period of time, to transmit a first connectivity message to the first server over a first network of the plurality of networks.

92. The system of claim 91, wherein the second server has further instructions, when a response message has not been received from the first server during a second predetermined period of time, to transmit a second connectivity message to the first server over a second network of the plurality of networks.

93. The system of claim 92, wherein the second server has further instructions, when a response message has not been received from the first server during a third predetermined period of time, to set a status of the first server as inactive and to clear all transmit buffers and all receive buffers, in a shared memory of the second server, pertaining to the first server.

94. The system of claim 86, wherein the second server has further instructions to maintain a valid protocol state with the first server during resynchronization.

* * * * *